(12) United States Patent
Toyoda et al.

(10) Patent No.: US 11,608,448 B2
(45) Date of Patent: Mar. 21, 2023

(54) THERMOSETTING POWDER COATING MATERIAL, COATING FILM USING THE COATING MATERIAL, AND COATED BODY COMPRISING THE COATING FILM

(71) Applicant: SOMAR CORPORATION, Tokyo (JP)

(72) Inventors: Masaaki Toyoda, Tokyo (JP); Fumiyuki Sasaki, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 39 days.

(21) Appl. No.: 17/204,151

(22) Filed: Mar. 17, 2021

(65) Prior Publication Data

US 2021/0292596 A1 Sep. 23, 2021

(30) Foreign Application Priority Data

Mar. 19, 2020 (JP) .............................. JP2020-048547

(51) Int. Cl.
*C09D 163/00* (2006.01)
(52) U.S. Cl.
CPC .................. *C09D 163/00* (2013.01)
(58) Field of Classification Search
CPC .................................................. C09D 163/00
USPC ......................................... 524/500
See application file for complete search history.

(56) References Cited

U.S. PATENT DOCUMENTS

2004/0235984 A1* 11/2004 Nicholl ................ C09D 163/00
524/495

FOREIGN PATENT DOCUMENTS

JP S60-144371 A 7/1985
JP 2019-172814 A 10/2019

OTHER PUBLICATIONS

Akata et al., JP S60-144371 A machine translation in English, Jul. 30, 1985 (Year: 1985).*
Japanese Office Action dated Dec. 6, 2022 in Japanese Application No. JP 2020-048547, English translation included, 8 pages.

* cited by examiner

*Primary Examiner* — David T Karst
(74) *Attorney, Agent, or Firm* — Rankin, Hill & Clark LLP

(57) ABSTRACT

There is provided a thermosetting powder coating material capable of forming a cured product having excellent workability at coating and high plasticity as well as heat resistance, resulting in heat resistance and crack resistance at bending processing. (A) denotes a bisphenol type epoxy resin having epoxy equivalent weight of 600 to 800 g/eq (not including 800 g/eq), (B) a rubber-modified epoxy resin, (C) a bisphenol type phenyl resin curing agent (D) a compound for activating (C), (D1) an imidazole compound and (D2) an amine-epoxy adduct type compound. The thermosetting powder coating material is composed of a finely pulverized composition. The composition comprises (A), (C) and (D) but does not comprise (B). (D) comprises (D1) and (D2), and a weight ratio of (D2) with respect to (D1) is 1.0 or more and 3.7 or less when (D1) is 1.

11 Claims, No Drawings

THERMOSETTING POWDER COATING MATERIAL, COATING FILM USING THE COATING MATERIAL, AND COATED BODY COMPRISING THE COATING FILM

FIELD OF THE INVENTION

The present invention relates to a thermosetting powder coating material (composition), a coating film (cured product) formed by using the coating material, and a coated body (coated article), which is an object having the coating film coated thereon.

DESCRIPTION OF THE RELATED ART

An epoxy resin powder coating material, one of thermosetting powder coating materials, is a powder coating material for insulation based on an epoxy resin, and a coating film thereof exhibits excellent mechanical characteristics, chemical resistance, anticorrosion and electric characteristics. Particularly, because of the excellent electric characteristics and anticorrosion of a formed coating film, it is used as an insulation material for covering objects to be coated in a metal processing field, such as a bus bar and steel pipe.

As an epoxy resin powder coating material, those containing a bisphenol A type epoxy resin, phenol-type curing agent, dicyandimamide, imidazole-type curing accelerator and/or imidazoline-type curing accelerator are known (Patent Document 1).

RELATED ART DOCUMENTS

Patent Documents

[Patent Document 1] Japanese Patent Unexamined Patent Publication (Kokai) No. H10-323616

SUMMARY OF THE INVENTION

In the metal processing field, a coated body obtained by coating a coating material on an object to be coated (for example, processed steel, etc.) and forming a coating film on a surface of the object to be coated is sometimes bent at an arbitrary angle during construction (when used). Therefore, it is important that the bending processing can be performed without causing any cracks on the coating film formed on the surface of the object to be coated (namely, that the coating film has sufficient plasticity).

Particularly when forming a coating film by coating an epoxy resin powder coating material on a bus bar, which is an example of objects to be coated, the coating film is required to have, in addition to the plasticity above, heat resistance to endure thermal expansion due to power supply.

Although a coating film formed by using a coating material of the patent document 1 has sufficient heat resistance, it does not satisfy the current demand for crack resistance at bending processing. Particularly in recent years, there are demands for improvement of crack resistance in coated reinforcement, such as coating of reinforcement incorporated in reinforced concrete, during bending processing under more severe environment, for example, in a cold region of 0° C. or lower.

Note that when forming a coating film by using a powder coating material, it is applied in a powder (solid) state to a surface of an object to be coated and, then, heated to melt (liquidate) the powder and, furthermore, heated to form a film (solidate), so that there are demands for preferable workability at coating, such that unnecessary sagging does not occur when melted.

An object of the present invention is to provide a thermosetting powder coating material capable of forming a cured product having excellent workability at coating, heat resistance, high plasticity even at a low temperature and, as a result, having heat resistance and crack resistance at bending processing; a coating film formed by a cured product of the coating material and having heat resistance and crack resistance at bending processing; and a coated body having the coating film on an object to be coated.

The present inventors found that the object above can be attained by adjusting epoxy equivalent weight in (A) and a compounding amount of (D2) in a composition comprising (A), (C) and (D) (not comprising (B)), wherein (D1) and (D2) are included as (D) and completed the present invention, (The components (A) to (D2) will be explained below.)

Namely, according to the present invention, a thermosetting powder coating material having the configuration explained below is provided.

Also, according to the present invention, a coating film obtained by thermally curing the thermosetting powder coating material having the configuration below and a coated body, wherein the coating film is formed at least on a part of an object to be coated, are provided.

Hereinafter, each component is as below.
(A) a bisphenol type epoxy resin having epoxy equivalent weight of 600 to 800 g/eq (excluding 800 g/eq)
(B) a rubber-modified epoxy resin
(C) a bisphenol type phenol resin curing agent
(D) a compound for activating (C)
   (D1) an imidazole compound
   (D2) an amine-epoxy adduct-type compound Here, the thermosetting powder coating material according to the present invention is a coating material for forming a cured product and composed of a finely pulverized material of a composition, wherein the composition comprises (A), (C) and (D) and does not comprise (B), (D) comprises (D1) and (D2), and a weight ratio of (D2) with respect to (D1) when (D1) is 1 is 1.0 or more and 3.7 or less.

Since the coating film of the present invention is obtained by thermally curing the thermosetting powder coating material of the present invention above, it is provided with plasticity that, when a test piece coated with the coating film having a thickness of 100 to 300 μm formed on a surface thereof was wound around a cylindrical mandril having a diameter of 4 mm so that the coating film faces outside under a 0° C. environment by a method based on type 1 of HS K 5600-5-1:1999, no crack or peeling is caused at the wound part of the coating film; and heat resistance of not causing any crack after heated at 210° C. for 800 hours (thermal aging) when using a test piece coated with the coating film having a thickness of 100 to 300 μm formed on a surface thereof.

As to heat resistance, in addition to or separated from maintaining appearance (not causing any crack after heating at 210° C. for 1000 hours), not exhibiting a decline of a withstand voltage by 50% or more from the initial value after heated at 210° C. for 1000 hours (thermal aging) would also satisfy the demand.

The coated body of the present invention is those which has the coating film of the present invention above formed at least on a part of an object to be coated.

The thermosetting powder coating material of the present invention comprises (A), (c) and (D) ((B) is not included), wherein (D1) and (D2) are included as (D), and epoxy equivalent weight in (A) and a compounding amount of (D2) are adjusted in a composition forming a finely pulverized material. Therefore, workability at coating is suitable (for example, no sagging is caused when melt and curing speed is fast when forming a film (rapid curability is realized), etc.), in addition to heat resistance of the coating film (cured product)) after curing, high plasticity is provided even at a low temperature (for example, 0° C. or lower). As a result, it is possible to form a cured product having heat resistance and crack resistance at bending processing.

Namely, according to the present invention, it is possible to provide a thermosetting powder coating material having excellent workability at coating, wherein in addition to heat resistance, high plasticity can be obtained even at a low temperature, and thereby a cured product having heat resistance and crack resistance at bending processing can be formed. Also, it is possible to provide a coating film formed by a cured product of the specific coating material and having heat resistance and crack resistance at bending processing. Furthermore, it is possible to provide a coated body having the specific coating film formed on an object to be coated.

DETAILED DESCRIPTION OF THE INVENTION

Below, best mode(s) for carrying out the present invention will be explained. However, the present invention is not limited to the embodiment(s) below and includes modified or improved modes of the embodiment(s) below based on ordinary knowledge of persons skilled in the art within a scope of the present invention.

A powder coating material of the present invention is a coating material for forming a cured product and composed of finely pulverized material of a composition. The composition comprises at least (A) a bisphenol type epoxy resin having epoxy equivalent weight of 600 to 800 g/eq (excluding 800 g/eq), (C) a bisphenol type phenol resin curing agent and (D) a compound for activating (C). (D) comprises (D1) an imidazole compound and (D2) an amine-epoxy adduct-type compound. Because it is described "at least", other component(s) than (A), (C) and (D) may be included in some cases, however, the powder coating material of the present invention does not comprise (B) a rubber-modified epoxy resin in terms of suppressing a decline of heat resistance after forming a coating film (cured coating film).

Namely, the powder coating material of the present invention is composed of a finely pulverized material of a composition comprising (A), (C) and (D) and not comprising (B).

Below, the powder coating material of the present invention will be explained in detail.

<(A)>

In the powder coating material of the present invention, a bisphenol type epoxy resin (an example of a glycidyl ether type epoxy resin using phenols as precursor) is used as the main component (A). Specifically, a bisphenol A type epoxy resin, bisphenol F type epoxy resin, a brominated bisphenol A type epoxy resin, hydrogenated bisphenol A type or AD type epoxy resin, etc. may be used.

Among them, it is preferable to use a bisphenol A type epoxy resin in terms of mechanical characteristics, chemical resistance, electric characteristics and anticorrosion of a cured product. Also, in the field where a flame retardant property is required, it can be dealt with by using a brominated bisphenol A type epoxy resin.

The epoxy equivalent weight in (A) is 600 g/eq or more but less than 800 g/eq. Thereby, a structure after forming a coating film (cured coating film) becomes dense, which contributes to improve heat resistance. To explain more in detail, when the epoxy equivalent weight is 600 g/eq or more, plasticity sufficient to withstand a stress can be obtained and when it is less than 800 g/eq, strength and heat resistance can be maintained. Two or more kinds of (A) may be combined to use so that the epoxy equivalent weight becomes in a range of 600 g/eq or more but less than 800 g/eq.

Physical properties of (A) are not particularly limited but, when considering the thermosetting property, the softening point is preferably 80 to 120° C. When using a combination of two or more kinds as (A), it is preferable to combine so that a softening point becomes in a range of 80 to 120° C. When the softening point of (A) is in the range above, uniformity of the coating film can be secured and a smooth coating film without any unevenness can be obtained. The softening point may be measured by the ring and ball method specified in K 7234.

In the present invention, in terms of improving plasticity at a low temperature, it is preferable not to compound any cresol novolak type epoxy resin (another example besides glycidyl ether type epoxy resin using phenols as precursor) in the powder coating material. As products of a cresol novolak type epoxy resin on market, EPICLON N-660, EPIKLON N-665, EPICLON N-670, EPICLON N-673, EPICLON N-695 (produced by DIC Corporation), EOCN-1020, EOCN-102S and EOCN-104S (produced by Nippon Kayaku Co., Ltd.), etc. may be mentioned.

Also, as explained later on, (A) does not comprise those rubber modified (those fall under (B)).

<(B)>

In the powder coating material of the present invention, (B) rubber-modified epoxy resin is not used. The rubber component in (B) does not contribute to crosslinking reaction of (A) and has a low glass transition temperature and high flexibility, so that an existence of the rubber component deteriorates elasticity and heat resistance of a coating film on the surface of the object to be coated. In order to suppress a decline of the performance of the coating film, (B) is not used.

In the present invention, a rubber-modified epoxy resin indicates those obtained by bringing an epoxy group in the epoxy resin react with (modified by) a rubber component.

The epoxy resin is not particularly limited and, for example, a bisphenol type epoxy resin, naphthalene type epoxy resin, biphenyl type epoxy resin, glycidyl amine type epoxy resin, alicyclic epoxy resin, dicyclopentadiene type epoxy resin, phenol novolak type epoxy resin, ortho-cresol novolak type epoxy resin, etc. may be mentioned.

A rubber component indicates rubber having a functional group, which reacts with an epoxy group in an epoxy resin, and is not particularly limited. For example, butadiene rubber, acrylic rubber, silicon rubber, butyl rubber, olefin rubber, styrene rubber, NBR (butadiene acrylonitrile rubber), SBR, IR and EPR, etc. may be mentioned. As a functional group of the rubber component, those amino-modified, hydroxy-modified or carboxy-modified, etc. may be mentioned.

A product obtained by reacting these rubber components with an epoxy resin by a well-known polymerization method is (B), which is excluded from compounding in the present invention. When (B) is not compounded, a decline of heat resistance after coating film formation (cured coating film) can be suppressed and it is possible to contribute to maintain required heat resistance.

<(C)>

A bisphenol type phenol resin curing agent compounded as (C) in the powder coating material of the present invention is obtained by bringing excessive bifunctional phenols react with a bifunctional epoxy resin and has a phenolic hydroxyl group at both terminals but has no epoxy group.

As a bifunctional epoxy resin, for example, bisphenol A type epoxy resin, bisphenol F type epoxy resin and other bisphenol type epoxy resins; hydrogenated bisphenol A, 1,6-hexanediol, polypropylene glycol and other diglycidyl ethers of alcohol; dimer acid and other diglycidyl esters, etc. may be mentioned. In terms of heat resistance, plasticity and anticorrosion, a bisphenol type epoxy resin is preferable. They may be used alone or in combination of two or more kinds.

As bifunctional phenols, for example, bisphenol A, bisphenol F, bisphenol S, bisphenol C, tetrabromobisphenol A, catechol, resorcin, hydroquinone, etc. may be mentioned. Among them, bisphenol A or bisphenol F is preferable.

As (C), what obtained by using bisphenol A type epoxy resin as a bifunctional epoxy resin and bringing it react with bisphenol A or bisphenol F as bifunctional phenol (a bisphenol A type phenol resin curing agent) or what obtained by using a bisphenol F type epoxy resin as a bifunctional epoxy resin and bringing it react with bisphenol A as bifunctional phenol (a bisphenol type phenol resin curing agent), etc. may be mentioned. (C) may be used in combination of two or more kinds.

Equivalent weight of active hydroxyl group in (C) is preferably 200 to 500 g/eq. When the equivalent weight of active hydroxyl group is 200 g/eq or more, plasticity sufficient to withstand a stress can be obtained and, when 500 g/eq or less, strength and heat resistance can be maintained.

It is desired that a compounding amount of (C) is determined so that an equivalent weight ratio of (C) to (A) becomes preferably 0.5 or more and 0.9 or less (particularly 0.6 or more and 0.8 or less). When compounded in this range, while maintaining crack resistance at bending processing, an appearance is not deteriorated even imposed with a thermal load of 210° C. for 800 hours and/or heat resistance of not causing any voltage decline even with a thermal load of 210° C. for 1000 hours can be provided. When the equivalent weight ratio of (C) is too small with respect to (A), a crosslinking density of a cured product (coating film) declines and heat resistance becomes insufficient. On the other hand, when the equivalent weight ratio of (C) to (A) is too great, a curing agent reminds excessively in the cured product (coating film) and, thereby, grids of the crosslinking structure become large and heat resistance becomes insufficient. Specifically, it is preferable to compound (C), for example, 25 parts by mass or more and 35 parts by mass or less with respect to (A) in 100 parts by mass.

<(D)>

It is essential that (D) used in the powder coating material of the present invention is obtained by combining a plurality of compounds capable of activating (C). Particularly, at least (D1) air imidazole compound and (D2) an amine-epoxy adduct-type compound are combined to be used as (D).

In the present invention, (D) serves as a curing catalyst (curing accelerator) of (A). The reason why not (D1) alone but (D2) is combined together as (D) in the present invention is as below. When composing (D) with (D1) alone, due to rapidly proceeding reaction, the coating film becomes hard and plasticity declines, so that (D2) is combined for use, with which the reaction proceeds gradually comparing with the case of (D1) alone. Also, in the present invention, by combining (D1) and (D2) at a predetermined weight ratio for use, sufficient plasticity can be given to the cured product and the effect of realizing quick curability for improving the efficiency can be exhibited.

<(D1)>

The (D1) used as a part of (D) includes imidazole and imidazole derivatives. Imidazole derivative is a compound wherein substituent, etc. is introduced to imidazole and, for example, 2-methyl imidazole, 2-undecyl imidazole, 2-heptadecyl imidazole, 1,2-dimethyl imidazole, 2-ethyl-4-methyl imidazole, 2-phenyl imidazole, 2-phenyl-4-methy imidazole, 1-benzil-2-methyl imidazole, 1-benzil-2-phenyl imidazole, 1-cyanoethyl-2-methyl imidazole, 1-cyanoethyl-2-undecyl imidazole, 1-cyanoethyl-2-ethyl-4-methyl imidazole, 1-cyanoethyl-2-phenyl imidazole, 1-amonomethyl-2-methyl imidazole, etc. may be included. Two or more kinds of (D1) may be combined for use.

<(D2)>

(D2) used as a part of (D) is formed by addition reaction of an epoxy compound with an aurin compound. Since (D2) is capable of proceeding curing gradually, when used with (D1), a curing acceleration effect can be slow and preservation stability is expected to be improved.

As an epoxy compound, for example, polyglycidyl ether obtained by bringing polyvalent phenol (ex. bisphenol A, bisphenol F, catechol and resorcinol etc.) or polyvalent alcohol (ex, glycerin and polyethylene glycol etc.) react with epichlorohydrin; glycidyl ether ester obtained by bringing hydroxy carboxylic acid (ex. p-hydroxy benzoic acid and 3-hydroxy naphthoic acid etc.) react with epichlorohydrin; polyglycidyl ester obtained by bringing polycarbonic acid (ex. phthalic acid and terephthalic acid etc.) react with epichlorohydrin glycidyl amine compound obtained by bringing 4,4'-diaminodiphenylmethane or m-aminophenol react with epichlorohydrin; multifunctional epoxy compounds (ex. epoxidizing phenol novolak resin, epoxidizing cresol novolak resin and epoxidizing polyolefin etc.); monofunctional epoxy compounds (ex, butyl glycidyl ether, phenyl glycidyl ether and glycidyl methacrylate etc.); etc. may be mentioned.

As an amine compound, for example, aliphatic amines (ex. diethylene triamine, triethylene tetramine, n-propyl amine, 2-hydroxymethyl aminopropylamine, cyclohexylamine and 4,4-diaminodicyclohexylmethane etc.); aromatic amine compounds (ex. 4,4'-diaminodiphenylmethane and 2-methylaniline etc.); nitrogen-containing heterocyclic compounds ex, 2-ethyl-4-methyl imidazole, 2-ethyl-4-methyl imidazoline, 2, 4-dimethyl imidazoline, piperidine, and piperazine etc.); primary or secondary amines having tertiary amino group in a molecule, such as amino compounds (ex. dimethylaminopropyl amine, diethylaminopropylamine, di-n-propylaminopropylamine, dibutylaminopropylamine, dimethylaminoethylamine, diethylaminoethylamine and N-methylpiperazine etc.) or imidazole compounds (ex. 2-methyl imidazole, 2-ethyl imidazole, 2-ethyl-4-methyl imidazole and 2-phenyl imidazole etc.); alcohol, phenols, thiols, carbonic acids and hydrazides, etc. having tertiary amino group in a molecule (cx. 2-dimethylaminoethanol, 1-methyl dimethylaminoethanol, 1-phenoxymethyl-2-dimethylaminoethanol, 2-dimethylaminoethanol, 1-butoxymethyl-2-dimethylaminoethanol, 1-(2-hydroxy phenoxypropyl)-2-methyl imidazole, 1-(2-hydroxy-3-phenoxypropyl)-2-ethyl methyl imidazole, 1-(2-hydroxy-3-butoxypropyl)-2-methyl imidazole, 1-(2-hydroxy-3-butoxypropyl)-2-ethyl-4- methyl imidazole, 1-(2-hydroxy-3-phenoxypropyl)-2-phnyl imidazoline, 1-(2-hydroxy-3-butoxypropyl)-2-methyl imidazoline, 2-(dimethylaminomethyl)phenol, 2,4,6-tris(dimethylaminomethyl)phenol, N-β-hydroxyethyl morpholine, 2-dimethylaminoethanethiol, 2-mercaptopyridine, 2-benzoimidazole, 2-mercaptobenzoimidazole, 2- mercaptobenzothiazole, 4-mercaptopyridine, N,N-dimethylamino benzoic add, N,N-dimethylglycine, nicotinic acid, isonicotinic acid, picolinic acid, N,N-dimethyl glycinehydrazide, N,N-dimethyl propionic acid hydrazide, nicotinic acid hydrazide and isonicotinic acid hydrazide etc); etc. may be mentioned.

As (D2), for example, an addition reactant of 2-methylimidazole and bisphenol A type epoxy resin and an additional reactant of 2-ethyl-4-methyl imidazole and bisphenol A type epoxy resin are included. Two or more kinds of (D2) may be combined for use.

Some of the (D2) are available on market as product names of, for example, AJICIJRE PN-23, AJICURE MY-24 and AJICURE AH-203 (produced by Ajinomoto Fine-Tech Co., Ltd.), EPICURE P-101, P-103, P-104 and P-108 (produced by HEXION), HARDENER X-33165 and HARDENER X-3670S (produced by ADEKA Corporation), etc. Among them, in terms of providing a cured coating film (cured product) with enhanced plasticity at a low temperature, it is preferable to use an additional reactant (EPICURE P-101) of 2-methyl imidazole: and a bisphenol A type epoxy resin.

In the present invention, it is also essential that a weight ratio of (D1) and (D2) in the entire (D) is, when (D1) is 1, (D2) is 1.0 or more and 3.7 or less (particularly, 1.5 or more and 3.5 or less). When combining specific (D1) and (D2) in the weight ratio range as above for use, curing speed can be adjusted and, thereby, plasticity is expected to be improved. When a ratio of (D1) is too large, the curing speed becomes too fast, resulting in a high crosslinking density when forming a coating film and the coating film is liable to be brittle. While when a ratio of (D1) is too small, the curing speed becomes insufficient and curing becomes insufficient when forming a coating film.

In the present invention, a compounding amount of (D) with respect to 100 parts by mass of (A) is, for example, 1.0 part by mass or more and 3.0 parts by mass or less and preferably 1.5 parts by mass or more and 2.5 parts by mass or less. When a compounding amount of (D) is too small, quick curability cannot be attained, a crosslinking density declines, strength of the coating film becomes insufficient and the coating film becomes fragile. While when the compounding amount of (D) is too large, the crosslinking density becomes high, the coating film becomes hard and plasticity declines, so that the coating film becomes fragile.

<Auxiliary Components>

The powder coating material of the present invention may be blended with auxiliary components as needed besides the components (A), (C) and (L)) above in a range of not undermining the effects of the invention. As auxiliary components, epoxy resins other than (A), curing agents other than (C), curing accelerator other than (D), flame retardant, colorant, filler, levelling agent, anti-sag agent, coupling agent, defoaming agent, mold release agent and fluidity control agent, etc. may be mentioned.

As a flame retardant, phosphorous compounds, halogen compounds, antimony compounds and metal hydroxides may be mentioned.

As a colorant, titanium oxide, carbon black, phthalocyanine blue, copper, etc. may be mentioned.

As a filler, silica, alumina, zirconia. titania, magnesia, ceria, yttria, zinc oxide, iron oxide, barium titanate, alumina-silica compound oxide and other oxides; silicon nitride, titanium nitride, boron nitride, aluminum nitride and other nitrides; calcium fluoride, barium fluoride, barium sulfate and other insoluble ionic crystal; silicon, diamond and other covalent-bonding crystals; silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, boehmite, apatite, mullite, spinel and olivine, etc. or compounds containing them, etc. may be mentioned.

In the present invention, in terms of improving plasticity, it is preferable that an epoxy resin powder coating material does not comprise any yellowing preventing agent which may be included in the auxiliary components. As a yellowing preventing agent, adipic dihydrazide, dicyandiamide, urea, aliphatic amine, aromatic amine, alicyclic amine, etc. may be mentioned.

<Production Method of Powder Coating Material>

A production method of the powder coating material of the present invention is not particularly limited and may be produced, for example, by the method explained below. After dry mixing compounding components with a mixer, etc. first, melt kneading, etc. by using an extruder is performed. The mixing temperature and mixing time are not particularly limited and may be set in accordance with kinds of materials and a composition ratio, etc. Normally, the mixing temperature is preferably 90 to 130° C. Then, the obtained mixture is cooled to set, the solid mixture (melt-kneaded product) is finely pulverized and classified so as to obtain a powder coating material.

<Powder Coating Material>

The powder coating material of the present invention comprises at least (A), (C) and (D). Depending on a mixing condition, partial polymerization proceeds and a polymer including a structure unit derived from (A) is included.

(i) Volume Average Particle Diameter

A particle diameter of the powder coating material of the present invention is not particularly limited but preferably the volume average particle diameter measured by a laser diffraction scattering method (JIS Z8825) is in a range of 50 to 70 μm. Note that the volume average particle diameter may be measured by using a laser diffraction particle size distribution measuring device (HELOS and RODOS produced by Sympatec GmbH, analyzing software: WINDOX5). By using a powder coating material having a volume average particle diameter in the range above, more excellent film formability can be obtained.

(ii) Slope Flow Degree

The powder coating material of the present invention preferably has a slope flow degree of 16 or less. Generally, a powder coating material with a large slope flow degree has low viscosity and the coating material easily flows when melt, on the other hand, a powder coating material with a small slope flow degree has high viscosity and the coating material is hard to flow when melt. When the slope flow degree of the powder coating material is 16 or less, detective of a coating film, such as a pinhole, or sagging hardly occurs and a good quality coating film having a desired film thickness can be obtained easily. The slope flow degree of the powder coating material is more preferably 11 or less. In terms of easiness of adjusting a film thickness of the coating film, resulting in obtaining uniform appearance and an insulation property of the coating film, the slope flow degree of the powder coating material is preferably 7 or more.

(iii) Gelling Time

The powder coating material of the present invention has preservation stability that gelling time at 200° C. based on JIS C 2104 after storing at 25° C. for 180 days is 15 seconds or longer (preferably 20 seconds or longer). When the gelling time is 15 seconds or longer, it has excellent preservation stability. When gelling time is too long, the slope flow degree of the coating material becomes too large, the viscosity becomes low and the coating material flows easily when melt, consequently, coating film defective, such as a pinhole, and sagging easily occur in some cases. In terms of maintaining the slope flow degree of the coating material to be 16 or less, the gelling time of the powder coating material is preferably 30 seconds or shorter.

<Coating Method of Powder Coating Material>

The coating method of the coating material of the present invention is not particularly limited and well-known coating methods may be applied. Specifically, electrostatic coating, frictional electrification coating, uncharged coating, fluidized bed dip coating, etc. may be mentioned. Among them, fluidized bed dip coating is preferable to obtain a coating film having a sufficient film thickness. By coating the powder coating material on a surface of an object to be coated and, then, curing by a method as above, a coating film can be obtained. By performing a surface treatment on the object to be coated as needed in advance, adhesiveness of the coating film can be improved, as well.

A film thickness of the coating film to be obtained from the powder coating material of the present invention is not particularly limited but 100 to 300 μm is preferable.

<Object to be Coated>

A kind and shape of an object to be coated (member), to which the powder coating material of the present invention is applied, are not particularly limited. The powder coating material of the present invention is, after coating and curing to form a cured coating film, preferably used for processed steel subjected to advanced bending processing at any angle (for example, a curve like a hairpin), that is when the effect of the present invention is brought out efficiently. Steel to be processed as an object to be coated is not limited to busbar, steel tube and other metal processing field, and it may be also used as a reinforcement incorporated in concrete and others in the engineering and construction field.

Namely, since the powder coating material of the present invention has good following performance to processing steel, on which advanced bending processing is performed after forming a coating film, it is also suitably used, for example, for stick-shaped articles, line-shaped articles, cylinder-shaped articles and corrugated articles, etc.

<Cured Product (Coating Film) of Powder Coating Material>

(i) Plasticity (Bending Resistance)

A coating film (cured product of the powder coating material) obtained by applying and curing the powder coating material of the present invention has plasticity that, when a test piece having a coating film formed to be a thickness of 150 to 250 μm on one surface is wound around a cylindrical mandrel having a diameter of 4 mm so that the coating film faces outside under a low temperature environment of 0° C. by a method based on type 1 in JIS K 5600-5-1:1999 (cylindrical mandril method), no crack or peeling is not caused on the wound part of the coating film. If any crack or peeling arises on the coating film after the test under the condition above, it is proved that required plasticity is not provided.

(ii) Heat Resistance

A coating film obtained by applying and curing the powder coating material of the present invention has heat resistance that no crack is caused after heated at 210° C. for 800 hours (thermal aging) and/or a withstand voltage after heated at 210° C. for 1000 hours does not decline 50% or more from the initial value. If any crack arises after heated at 210° C. for 800 hours and/or if a withstand voltage declines by 50% or more from the initial value after heated at 210° C. for 1000 hours, it does not have required heat resistance. By using a powder coating material having an optimal composition in the range disclosed above and heightening a crosslinking density of the coating film, it is also possible to provide a coating film with heat resistance of not causing any crack under more severe condition like heated at 230° C. for 200 hours.

(iii) Glass Transition Temperature (Tg)

A coating film obtained by applying and curing the powder coating material of the present invention has a glass transition temperature of 90° C. or higher. The glass transition temperature is measured by using a differential scanning calorimetry (DSC) and calculated. Specifically, measurement is made at a temperature rising rate of 10° C./min. in a temperature range of 25° C. to 280° C., Samples used for Tg measurement are the obtained powder coating material precisely weighed to be an amount of 3 to 8 mg and prepared by curing at 170° C. or higher for 90 seconds. If the glass transition temperature of the cured product (coating film) of the powder coating material is lower than 90° C., it cannot be said that heat resistance is provided. A glass transition temperature of a cured product of the powder coating material is more preferably 100° C. or higher.

<Coated Body>

A coated body of the present invention has a coating film of the present invention formed at least on a part of an object to be coated or on the entire object.

EXAMPLES

Below; the present invention will be explained mode in detail based on experimental examples (including examples and comparative examples), but the present invention is not limited to the examples. Below, "part" indicates "part by mass" and "%" indicates "weight %".

[Components of Powder Coating]

Those listed below were prepared as (A).

*A1: a bisphenol A type (solid) epoxy resin having epoxy equivalent weight of 630 g/eq
(GESR 902, Epoxy Base Electronic Material Corporation Limited (CN))

*A2: a bisphenol A type (solid) epoxy resin having epoxy equivalent weight of 810 g/eq
(GESR 904, Epoxy Base Electronic Material Corporation Limited (CN))

*A3: a bisphenol A type (solid) epoxy resin having epoxy equivalent weight of 1600 g/eq
(GESR 907, Epoxy Base Electronic Material Corporation Limited (CN))

*A4: a bisphenol A type (solid) epoxy resin having epoxy equivalent weight of 1000 g/eq
(Epotohto YD-904 produced by NIPPON STEEL Chemical & Material CO., Ltd.)

As (B), the material below was prepared.

*B1: a butadiene acrylonitryl rubber-modified epoxy resin
(EPOX-MK SR-35K produced by Printec Corporation, epoxy equivalent weight of 1075 g/eq, softening point at 95° C.)

Note that the epoxy equivalent weight in the entire (A) and (B) is a value (about 951 in the case of Example 6) calculated by dividing a compounding amount of each component (for example, in Example 6, A2 was 70 parts by mass, A3 was 30 parts by mass and B1 was 0 parts by mass) by epoxy equivalent weight of the each component (for example, A2 was 810 g/eq, A3 was 1600 g/eq) assuming that the total is 100 parts by mass, adding the obtained values (0.08642 for A2, 0.01875 for A3 and 0 for B1), setting the added value (0.10517) as a denominator and setting the total weight of A and B (100) as a numerator.

As (C) materials listed below were prepared.

*C1: a bisphenol A type phenol resin (jER CURE 170 produced by Mitsubishi Chemical Corporation, having phenolic hydroxy group equivalence weight of 343 g/eq)

*C2: ethylene glycol bisanhydrotrimellitate (anhydride-type curing agent, RIKACID TMEG-500 produced by Japan Chemical Co., Ltd., having phenolic hydroxy group equivalence weight of 210 g/eq)

*C3: dicyan diamide (solid-dispersible amine-based hardener, jER CURE DICY20 produced by Mitsubishi Chemical Corporation)

As (D1), the material below was prepared.

*D11: 2-methyl imidazole (CUREZOL 2MZ-H produced by SHIKOKU CHEMICALS CORPORATION)

As (D2), the material below was prepared.

*D21: an amine-epoxyadduct-type compound (addition reactant of 2-methyl imidazole and bisphenol A type epoxy resin, EPICURE P-101 produced by FLEXION)

As (E) (filler), materials listed below were prepared.

*E1: a titanium oxide (TIPAQUE R-830 produced by ISHIHARA SANGYO KAISHA, LTD.)

*E2: carbon black (Mitsubishi Carbon Black produced by Mitsubishi Chemical Corporation)

1. Production of Powder Coating Material

Experimental Examples 1 to 12

After dry-blending all materials for each experimental example at each compounding ratio (weight) shown in Table 1, kneading by using an extruder was performed and a kneaded product was obtained. The obtained kneaded product was cooled to solidate and, then, pulverized so as to obtain a powder coating material.

2. Evaluation

As to the powder coating materials obtained in the respective examples, various characteristics (slope flow degree and preservation stability) were evaluated in the methods explained below. Also, cured products (thermally-cured coating films) of the powder coating materials obtained in the respective examples were evaluated as to various characteristics (plasticity and heat resistance) in the methods explained below. The results are shown in Table 1.

(2-1) Slope Flow Degree

A powder coating material obtained in each experimental example in an amount of 0.5 g was put in a tablet molding mold having an inner diameter of 13 mmø, a pressure was applied with a load of 16 MPa for 60 seconds to obtain a tablet, and a diameter (a) and a thickness (b) of the tablet was measured by using a caliper. Next, the obtained tablet was placed on a slide glass, heating it in a hot air dryer at 150° C. for 20 minutes and, then, a diameter (c) of the tablet was measured in the same way. A value of the diameter increased due to heat (c-a) was divided by a pre-heat thickness (b), so that a slope flow value of each powder coating material obtained in each of the experimental examples was calculated. Standards for the evaluation are as below.

◎: the slope flow value was 11 or less
○: the slope flow value exceeded 11 but was 16 or less
X: the slope flow value exceeded 16

(2-2) Preservation Stability

As to preservation stability of powder coating materials, gelling time was measured and evaluated based on the standards below.

After storing the powder coating materials obtained in the respective experimental examples at 25° C. for 180 days, the powder coating materials after storing in an amount of approximately 0.05 to 0.1 g was put in a circular recess of a hot plate kept at 200° C., mixed with a mixing rod, and time (seconds) until no sticky threads were formed, that is, until it is gelled was measured. it was measured based on JIS C 2104. Standards for the evaluation are as below.

◎: gelling time was 20 seconds or longer
○: gelling time was 15 seconds or longer but shorter than 20 seconds
X: gelling time was shorter than 15 seconds (2-3) Plasticity As to plasticity of the thermally-cured coating films, bending resistance was measured and evaluated based on the standards below.

A rectangle-shaped SPCC-SB plate (100 mm in length, 50 mm in width and 1 mm in thickness) preheated at 240° C. was prepared, and a powder coating material obtained in each experimental example was applied on its one surface by a fluidized bed dip coating method, so that a thickness after curing becomes 100 to 300 µm. The resultant was cured at 150° C. for 30 minutes in a constant temperature blowing furnace and test pieces were obtained.

The obtained test pieces were subjected to a bending resistance test regulated in type 1 of JIS K 5600-5-1:1999 under a low temperature environment of 0° C. by using a coating film bending test device "No, 514" (produced by YASUDA SEIKI Company). After fixing a test piece to a test device set with a cylindrical mandril having a diameter of 4 mm by holding the test piece with a body clamp, a roller was brought close to the coating film formed surface of the test piece, and a handle was rotated 180 degrees uniformly not abruptly but by taking time of 1 to 2 seconds. After that, cracks of the coating film and peeling of the coating film from the SPCC-SB plate were observed visually. The evaluation standards are as below.

○: no crack or peeling of the coating film observed
X: crack or peeling of the coating film observed (2-4) Heat Resistance Heat resistance of the thermally-cured coating film was evaluated by observing the appearance and by evaluating the voltage resistance.

A soft steel plate (60 mm in length, 60 mm in width and 3.2 mm in thickness) was prepared and a powder coating material obtained by each experimental example was applied by a fluidized bed dip coating method so as to obtain a thickness after curing of 100 to 300 µm. The resultant was cured at 150° C. for 30 minutes in a constant-temperature blowing furnace, and a test plate was obtained.

[Appearance Observation]

The obtained test plate was heated at 210° C. (thermal aging) and taken out after every 200 hours and the time until arising of a crack was observed on the thermally-cured coating film. An existence of a crack was observed visually.

Two samples were prepared for each example and evaluated. The evaluation standards are as below.
⊚: no crack arose on the coating film of two of the samples after 800 hours
○: crack(s) arose on the coating film of one sample after 800 hours
X: crack(s) arose on the coating film of two of the samples after 800 hours

[Voltage Resistance]

The obtained test plate was heated at 210° C. (thermal aging) and taken out after every 200 hours in order to measure voltage resistance (kV/0.5 min) and time until any abnormality arose was checked. Two samples were produced for each example and evaluated. The evaluation standards are as below. Note that abnormality is defined as when a voltage resistance value declines by 50% or more from the pre-heating initial value as a reference.

○: no abnormality arose after 1000 hours on both of the two samples
X: abnormality arose after 1000 hours on both of the two samples

TABLE 1

| COMPONENTS | | | EQUIVALENT WEIGHT | 1 | 2 | 3 | 4 | 5 | 6 |
|---|---|---|---|---|---|---|---|---|---|
| A | | A1 | 630 | 5 | 5 | 5 | 5 | 80 | — |
| | | A2 | 810 | 95 | 95 | 95 | 95 | 20 | 70 |
| | | A3 | 1600 | — | — | — | — | — | 30 |
| | | A4 | 1000 | — | — | — | — | — | — |
| | | ※EQUIVALENT WEIGHT (g/eq) IN TOTAL OF (A) AND (B) | | 799 | 799 | 799 | 799 | 659 | 951 |
| B | | B1 | 1075 | — | — | — | — | — | — |
| C | | C1 | 343 | 34.4 | 34.4 | 29.2 | 34.4 | 43.4 | 27.3 |
| | | C2 | 210 | — | — | — | — | — | — |
| | | C3 | | — | — | — | — | — | — |
| | | ※EPOXY GROUP IN (A)/ PHENOLIC HYDROXYL GROUP IN (C) | | 1/0.8 | 1/0.8 | 1/0.7 | 1/0.8 | 1/0.8 | 1/0.8 |
| D | | D1 | D11 | 0.5 | 0.6 | 0.7 | 0.3 | 0.4 | 0.4 |
| | | D2 | D21 | 0.4 | 0.6 | 1.5 | 1.0 | 1.5 | 1.5 |
| | | ※D1:D2 = 1:● (WEIGHT RATIO) | | 0.8 | 1.0 | 2.1 | 3.3 | 3.8 | 3.8 |
| E | | E1 | | 6 | 6 | 6 | 6 | 6 | 6 |
| | | E2 | | 0.3 | 0.3 | 0.3 | 0.3 | 0.3 | 0.3 |
| CHARACTERISTICS EVALUATION | COATING MATERIAL | SLOPE FLOW DEGREE | | 18(X) | 15(○) | 8(⊚) | 11(⊚) | 21(X) | 9(⊚) |
| | | PRESERVATION STABILITY (SECOND) | | 35(⊚) | 30(⊚) | 20(⊚) | 27(⊚) | 21(⊚) | 21(⊚) |
| | COATING FILM | PLASTICITY | | ○ | ○ | ○ | ○ | ○ | ○ |
| | | HEAT RESISTANCE (APPEARANCE OBSERVATION) | | ○ | ○ | ⊚ | ○ | ○ | X |
| | | HEAT RESISTANCE (VOLTAGE RESISTANCE)(kV/0.5 mm) | | ○ | ○ | ○ | ○ | ○ | ○ |

| COMPONENTS | | | EQUIVALENT WEIGHT | 7 | 8 | 9 | 10 | 11 | 12 |
|---|---|---|---|---|---|---|---|---|---|
| A | | A1 | 630 | 80 | — | — | — | — | — |
| | | A2 | 810 | 20 | 100 | 100 | — | — | 56 |
| | | A3 | 1600 | — | — | — | — | — | 32 |
| | | A4 | 1000 | — | — | — | 100 | 100 | — |
| | | ※EQUIVALENT WEIGHT (g/eq) IN TOTAL OF (A) AND (B) | | 659 | 810 | 810 | 1000 | 1000 | 987 |
| B | | B1 | 1075 | — | — | — | — | — | 12 |
| C | | C1 | 343 | — | — | — | 36 | 36 | 27 |
| | | C2 | 210 | 24.8 | 18.6 | — | — | — | — |
| | | C3 | | 0.2 | 0.2 | — | — | — | — |
| | | ※EPOXY GROUP IN (A)/ PHENOLIC HYDROXYL GROUP IN (C) | | 1/0.8 | 1/0.7 | — | 1/1.1 | 1/1.1 | 1/0.9 |
| D | | D1 | D11 | — | — | 0.5 | 0.4 | — | 0.4 |
| | | D2 | D21 | — | — | — | — | 3.0 | 1.5 |
| | | ※D1:D2 = 1:● (WEIGHT RATIO) | | — | — | — | — | — | 3.8 |
| E | | E1 | | 6 | 6 | — | — | — | — |
| | | E2 | | 0.3 | 0.3 | — | — | — | — |
| CHARACTERISTICS EVALUATION | COATING MATERIAL | SLOPE FLOW DEGREE | | 16(○) | 9(⊚) | 6(⊚) | 17(X) | 5(⊚) | 8(⊚) |
| | | PRESERVATION STABILITY (SECOND) | | 25(⊚) | 30(⊚) | 20(⊚) | 35(⊚) | 10(X) | 20(⊚) |
| | COATING FILM | PLASTICITY | | X | X | X | ○ | ○ | ○ |
| | | HEAT RESISTANCE (APPEARANCE OBSERVATION) | | ○ | ○ | X | ○ | X | X |
| | | HEAT RESISTANCE (VOLTAGE RESISTANCE)(kV/0.5 mm) | | ○ | ○ | X | ○ | ○ | ○ |

3. Consideration

As shown in Table 1, if both of the (D1) and (D2) are not included as (D) in the coating material (Experimental Examples 7-11), one or more of the slope flow degree of the coating material and plasticity and heat resistance of the coating film were not satisfied. In the experimental example 11, wherein a large amount of catalyst was compounded in the coating material and, thereby, the gelling time was as short as 10 seconds, heat resistance (appearance observation) was not satisfied. It is considered that it was because the curing time was too short to build a uniform and a dense crosslinking structure in the coating film.

In the case where both of the (D1) and (D2) were included as (D) in the coating material (Experimental Examples 1-6 and 12), if a weight ratio of (D2) to (D1), when (D1) was 1, was less than 1.0 (Experimental Example 1) or more than 3.7 (Experimental Examples 5, 6 and 12), one or more of the slope flow degree, plasticity and heat resistance was not able to be satisfied. Note that comparing with Experimental Examples 6 and 12, Experimental Example 5 comprises (A1) and (A2) both having small epoxy equivalent weight and the whole epoxy equivalent weight of (A) and (B) was in a suitable range (659 g/eq) (Experimental Examples 6 and 12 were out of the suitable range), so that heat resistance (appearance observation) was favorable, however, since a large amount of (A1) having the smallest epoxy equivalent weight was compounded ((A1):(A2)=80:20), the slope flow degree of the coating material was poor and workability when melt was deteriorated.

On the other hand, if a weight ratio of (P2) with respect to (D1), when (D1) was 1, was 1.0 or more and 3.7 or less (Experimental Examples 2-4), all of the slope flow degree, plasticity and heat resistance were able to be satisfied.

The invention claimed is:

1. A thermosetting powder coating material for forming a cured product, composed of a finely pulverized composition, wherein
    the composition comprises (A), (C) and (D) below and does not comprise (B), (D) comprises (D1) and (D2) below, and a weight ratio of (D2) to (D1) is 1.0 or more and 3.7 or less,
(A): a bisphenol type epoxy resin having epoxy equivalent weight of 600 to 800 g/eq, not including 800 g/eq
(B): a rubber-modified epoxy resin
(C): a bisphenol type phenol resin curing agent
(D): a compound for activating (C)
    (D1): an imidazole compound
    (D2): an amine-epoxy adduct-based compound.

2. The powder coating material according to claim 1, wherein gelling time at 200° C. measured based on JIS C 2104 after storing at 25° C. for 180 days is 15 seconds or longer.

3. The powder coating material according to claim 2, wherein a slope flow degree under a heating condition of 150° C. for 20 minutes is 16 or less.

4. A coating film obtained by thermally curing the thermosetting powder coating material according to claim 3, provided with
    plasticity that, when a test piece coated with the coating film having a thickness of 100 to 300 μm formed on a surface thereof was wound around a cylindrical mandrill having a diameter of 4 mm so that the coating film faces outside under a 0° C. environment by a method based on type 1 of JIS K 5600-5-1:1999, no crack or peeling is caused at the wound part of the coating film; and
    heat resistance of not causing any crack after heated at 210° C. for 800 hours when using a test piece coated with the coating film having a thickness of 100 to 300 μm formed on a surface thereof.

5. A coated body, on which the coating film according to claim 4 is formed at least on a part of an object to be coated.

6. A coating film obtained by thermally curing the thermosetting powder coating material according to claim 2, provided with
    plasticity that, when a test piece coated with the coating film formed having a thickness of 100 to 300 μm formed on a surface thereof was wound around a cylindrical mandril having a diameter of 4 mm so that the coating film faces outside under a 0° C. environment by a method based on type 1 of JIS K 5600-5-1:1999, no crack or peeling is caused at the wound part of the coating film; and
    heat resistance of not causing any crack after heated at 210° C. for 800 hours when using a test piece coated with the coating film having a thickness of 100 to 300 μm formed on a surface thereof.

7. A coated body, on which the coating film according to claim 6 is formed at least a part of an object to be coated.

8. The powder coating material according to claim 1, wherein a slope flow degree under a heating condition of 150° C. for 20 minutes is 16 or less.

9. A coating film obtained by thermally curing the thermosetting powder coating material according to claim 1, provided with
    plasticity that, when a test piece coated with the coating film formed having a thickness of 100 to 300 μm formed on a surface thereof was wound around a cylindrical mandril having a diameter of 4 mm so that the coating film faces outside under a 0° C. environment by a method based on type 1 of JIS K 5600-5-1:1999, no crack or peeling is caused at the wound part of the coating film; and
    heat resistance of not causing any crack after heated at 210° C. for 800 hours when using a test piece coated with the coating film having a thickness of 100 to 300 μm formed on a surface thereof.

10. A coated body, on which the coating film according to claim 9 is formed at least a part of an object to be coated.

11. The powder coating material according to claim 1, wherein a compounding amount of (D) to 100 parts by mass of (A) is 1.0 part by mass or more and 3.0 parts by mass or less.

* * * * *